(12) United States Patent
Lopez

(10) Patent No.: US 9,919,373 B2
(45) Date of Patent: Mar. 20, 2018

(54) SOLDERING WIRE DISPENSER APPARATUS

(71) Applicant: Sergio Lopez, Brea, CA (US)

(72) Inventor: Sergio Lopez, Brea, CA (US)

( * ) Notice: Subject to any disclaimer, the term of this patent is extended or adjusted under 35 U.S.C. 154(b) by 0 days.

(21) Appl. No.: 15/362,798

(22) Filed: Nov. 28, 2016

(65) Prior Publication Data

US 2017/0189980 A1   Jul. 6, 2017

Related U.S. Application Data

(60) Provisional application No. 62/260,405, filed on Nov. 27, 2015.

(51) Int. Cl.
*B23K 3/06* (2006.01)
*B65H 57/12* (2006.01)
*B65H 49/20* (2006.01)
*B65H 49/32* (2006.01)

(52) U.S. Cl.
CPC .......... *B23K 3/063* (2013.01); *B65H 49/205* (2013.01); *B65H 49/324* (2013.01); *B65H 57/12* (2013.01)

(58) Field of Classification Search
CPC .. B65H 49/205; B65H 49/322; B65H 49/324; B65H 57/12; B23K 3/06; B23K 3/0607; B23K 3/063
See application file for complete search history.

(56) References Cited

U.S. PATENT DOCUMENTS

| | | | | |
|---|---|---|---|---|
| 5,813,591 | A * | 9/1998 | Quinn | B23K 3/063 226/127 |
| 6,027,068 | A * | 2/2000 | Lantsman | B23K 3/063 226/187 |
| 6,744,003 | B1 * | 6/2004 | Ono | B23K 3/025 219/85.16 |
| 2006/0243851 | A1 * | 11/2006 | Ishii | B23K 3/06 242/557 |
| 2007/0075119 | A1 * | 4/2007 | Wong | B23K 3/063 228/101 |
| 2012/0280020 | A1 * | 11/2012 | Nishimura | B23K 3/063 228/41 |

* cited by examiner

*Primary Examiner* — William E Dondero
(74) *Attorney, Agent, or Firm* — Ruth Eure

(57) ABSTRACT

A soldering wire dispensing apparatus is provided and comprises a support frame with a motor is mounted therein. A motor axle extends from the motor and rotates upon activation of the motor. A dispenser spool is mounted within the support frame with a predetermined amount of solder wire. A dispensing axle extends from the dispenser spool. A connecting belt links the motor axle to the dispensing axle to rotate the dispensing axle with rotation of the motor axle. A flexible wire nozzle is positioned in and extends from the support frame. An adjustment housing is mounted to the support frame. An upright bar is slidably mounted within the adjustment housing. A lever is connected to the upright bar and extends through the adjustment housing. A connecting wire extends between the second end of the wire nozzle and the upright bar. Upon moving the lever downward, the connecting wire nozzle bends nozzle to a predetermined angle relative to the adjustment housing.

20 Claims, 4 Drawing Sheets

SOLDERING WIRE DISPENSER APPARATUS

CLAIM OF PRIORITY

This patent application claims priority under 35 USC 119 (e) (1) from U.S. Provisional Patent Application Ser. No. 62/260,405 filed Nov. 27, 2015, of common inventorship herewith entitled, "Wire Tech," which is incorporated herein by reference as though the same were set forth in its entirety.

FIELD OF THE INVENTION

The present invention pertains to the field of industrial wiring, and more specifically to the field of automatic soldering machines and dispensers.

BACKGROUND OF THE INVENTION

Soldering is used to join two or more metal items together by melting and flowing a filler metal called solder into a joint. A soldering iron, soldering gun or torch is used to melt and flow the filler metal or solder which has a lower melting point than the workpiece. A variety of metal alloys are used as solder for applications including plumbing, Heating, Ventilation, and Air Conditioning or HVAC, refrigeration equipment and jewelry making. These alloys melt at differing temperatures and provide soldered joints with differing characteristics. In each case, the solder material consists of wire which must be unwound by hand from a coil. When an individual performing a soldering operation requires more solder, he or she has no alternative but to cease the operation long enough to unwind more wire thereby interrupting their work and losing time.

The prior art has put forth several designs for soldering machines. Among these are:

US Patent Publication 2012/0280020 to Tetsuro Nishimura describes an apparatus for feeding wire solder with high tensile strength and pull cut resistance. The wire solder has an extended wire solder and a core wire having a higher tensile strength than the wire solder. The apparatus for feeding the wire solder comprises a wire solder storage section where the wire solder with a core wire is stored and a core wire rewinding member that takes up an end of the core wire to rewind the core wire. While the core rewinding member is rotated to rewind the core wire, the single or multiple strands of solder are heated to perform soldering at the location of soldering upstream of the core wire rewinding member.

US Patent 2007/00751 to Chung Wong describes a solder feeder includes a housing member, a solder gripper assembly with a solder guide tube, a solder holder, a trigger means, and a solder path tube receiving a straight or a curved nozzle. Solder from a solder spool is extended forward when the trigger means is engaged or activated. The solder guide tube from the solder gripper assembly recesses into the solder path tube to provide a guaranteed solder path when the solder wire is advanced forward. The solder wire is curved at a proper curvature when it escapes from a tip of the nozzle. An electric version of the solder feeder uses a DC motor to drive a pulley to wind a belt or a cable for advancing the solder wire forward. Both devices extend a length of curved solder requiring the use of only one hand and allowing a true non-stop solder operation on copper pipe joints or similar tasks.

U.S. Pat. No. 6,744,003 to Harry Ono describes an automatic soldering machine used for high volume assembly operations of components such as PC boards, electrical terminals, and the like. The automatic soldering machine utilizes many design features which substantially reduces maintenance, simplifies the soldering operation, improves the process reliability, reduces the cycle time, and reduces the cost to fabricate such a machine.

U.S. Pat. No. 5,813,591 to David L. Quinne and Kevin M. Quinn describes a solder dispenser which includes a body portion having a sleeve thereon with a moveable shuttle extending through the sleeve. A solder holder bracket is retained on the moveable shuttle for retaining a spool of solder on the solder dispenser. A solder gripper is carried on the body for gripping solder upon moving the shuttle to extend a length of solder from the solder spool. The solder gripper acts as a one way cam which retains the solder as it is being extending from the spool but also allows solder to pass therethrough once it is extended from the spool. A trigger assembly is used to displace the shuttle and thereby extend a length of solder. The trigger assembly allows for dispensing a selected or desired length of solder from the spool.

None of these prior art references describe the present invention.

SUMMARY OF THE INVENTION

It is an object of the present invention to provide a portable, battery powered, motorized tool mechanically constructed to dispense solder wire smoothly, evenly and on demand at the press of a button.

The present invention is a soldering wire dispensing apparatus for dispensing solder wire in a smooth and even manner. The soldering wire dispensing apparatus comprises a support frame having a top side, a bottom side, a front side, a rear side, a first side, and a second side. A motor is mounted within the support frame. A rotatable motor axle extends from the motor and through the second side of the support frame with the motor axle rotating upon activation of the motor. A dispenser spool is mounted within the support frame with the dispenser spool having a predetermined amount of solder wire wrapped around the dispenser spool. A dispensing axle extends from the dispenser spool and through the second side of the support frame. A connecting belt links the motor axle to the dispensing axle with the dispensing axle rotating upon rotation of the motor axle. A flexible wire nozzle having a first end and a second end is provided. The first end of the wire nozzle is positioned within the support frame and the second end of the wire nozzle extends above the top side of the support frame. An adjustment housing is mounted to the top side of the support frame. An upright bar is slidably mounted within the adjustment housing. A lever is connected to the upright bar with the lever extending through the adjustment housing. A connecting wire extends between the second end of the wire nozzle and the upright bar. The solder wire extends from the dispenser spool, into the first end of the wire nozzle, through the wire nozzle, and out the second end of the wire nozzle. Upon moving the lever in a generally downward direction, the connecting wire between the second end of the wire nozzle and the upright bar bends the second end of the wire nozzle to a predetermined angle relative to the adjustment housing.

In addition, the present invention includes a method for dispensing solder wire in a smooth and even manner. The method comprises providing a support frame having a top side, a bottom side, a front side, a rear side, a first side, and a second side, mounting a motor within the support frame, extending a rotatable motor axle from the motor and through the second side of the support frame, rotating the motor axle upon activation of the motor, mounting a dispenser spool within the support frame, wrapping a predetermined amount of solder wire around the dispenser spool, extending a dispensing axle from the dispenser spool and through the second side of the support frame, linking the motor axle to the dispensing axle with a connecting belt, rotating the dispensing axle upon rotation of the motor axle, providing a flexible wire nozzle having a first end and a second end, positioning the first end of the wire nozzle within the support frame, extending the second end of the wire nozzle above the top side of the support frame, mounting an adjustment housing to the top side of the support frame, slidably mounting an upright bar within the adjustment housing, connecting a lever to the upright bar, extending the lever through the adjustment housing, extending a connecting wire between the second end of the wire nozzle and the upright bar, extending the solder wire from the dispenser spool, into the first end of the wire nozzle, through the wire nozzle, and out the second end of the wire nozzle, moving the lever in a generally downward direction, and bending the second end of the wire nozzle to a predetermined angle relative to the adjustment housing.

The present invention further includes a soldering wire dispensing apparatus for dispensing solder wire in a smooth and even manner. The soldering wire dispensing apparatus comprises a support frame having a top side, a bottom side, a front side, a rear side, a first side, and a second side. A motor is mounted within the support frame. A rotatable motor axle extends from the motor and through the second side of the support frame with the motor axle rotating upon activation of the motor. A dispenser spool is mounted within the support frame with the dispenser spool having a predetermined amount of solder wire wrapped around the dispenser spool. A dispensing axle extends from the dispenser spool and through the second side of the support frame. A connecting belt links the motor axle to the dispensing axle with the dispensing axle rotating upon rotation of the motor axle. A tensioning mechanism is mounted within the support frame nearingly adjacent the dispenser spool for tensioning the soldering wire as the soldering wire exits the dispenser spool. A dispenser housing is mounted to the top side of the support frame. A flexible wire nozzle having a first end and a second end is provided with at least a portion of the wire nozzle mounted within the dispenser housing. The first end of the wire nozzle is positioned within the support frame and the second end of the wire nozzle extends above the top side of the support frame. An adjustment housing is mounted to a side of the dispenser housing. An upright bar is slidably mounted within the adjustment housing. A releasably securable lever is connected to the upright bar with the lever extending through the adjustment housing. A connecting wire extends between the second end of the wire nozzle and the upright bar. The solder wire extends from the dispenser spool, through the tensioning mechanism, into the first end of the wire nozzle, through the wire nozzle, and out the second end of the wire nozzle. Upon moving the lever in a generally downward direction, the connecting wire between the second end of the wire nozzle and the upright bar bends the second end of the wire nozzle to a predetermined angle relative to the adjustment housing.

DETAILED DESCRIPTION OF THE INVENTION

Figure 1:
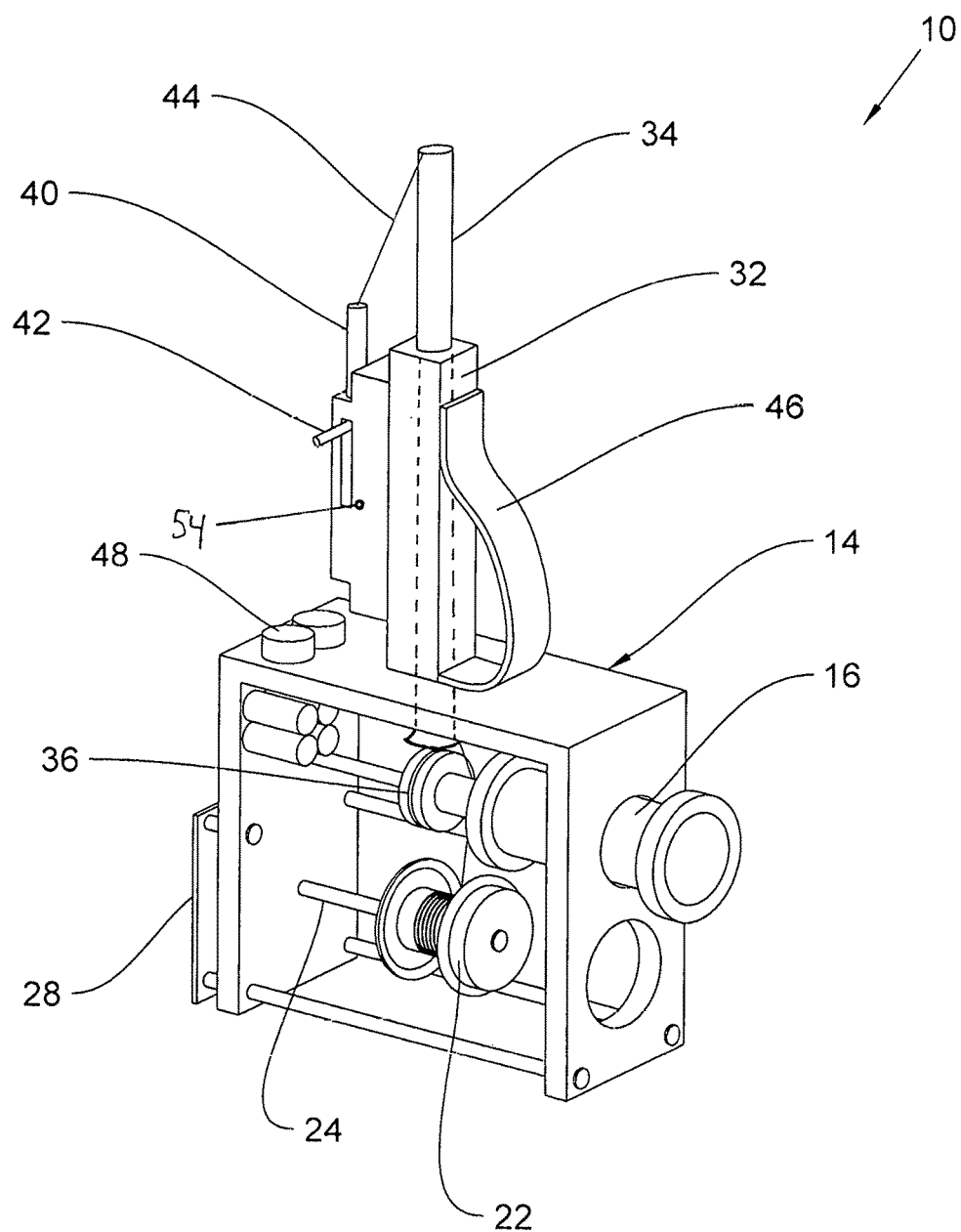
FIG. 1 is a front perspective view illustrating a soldering wire dispensing apparatus, constructed in accordance with the present invention, showing the mechanical components.
Figure 2:
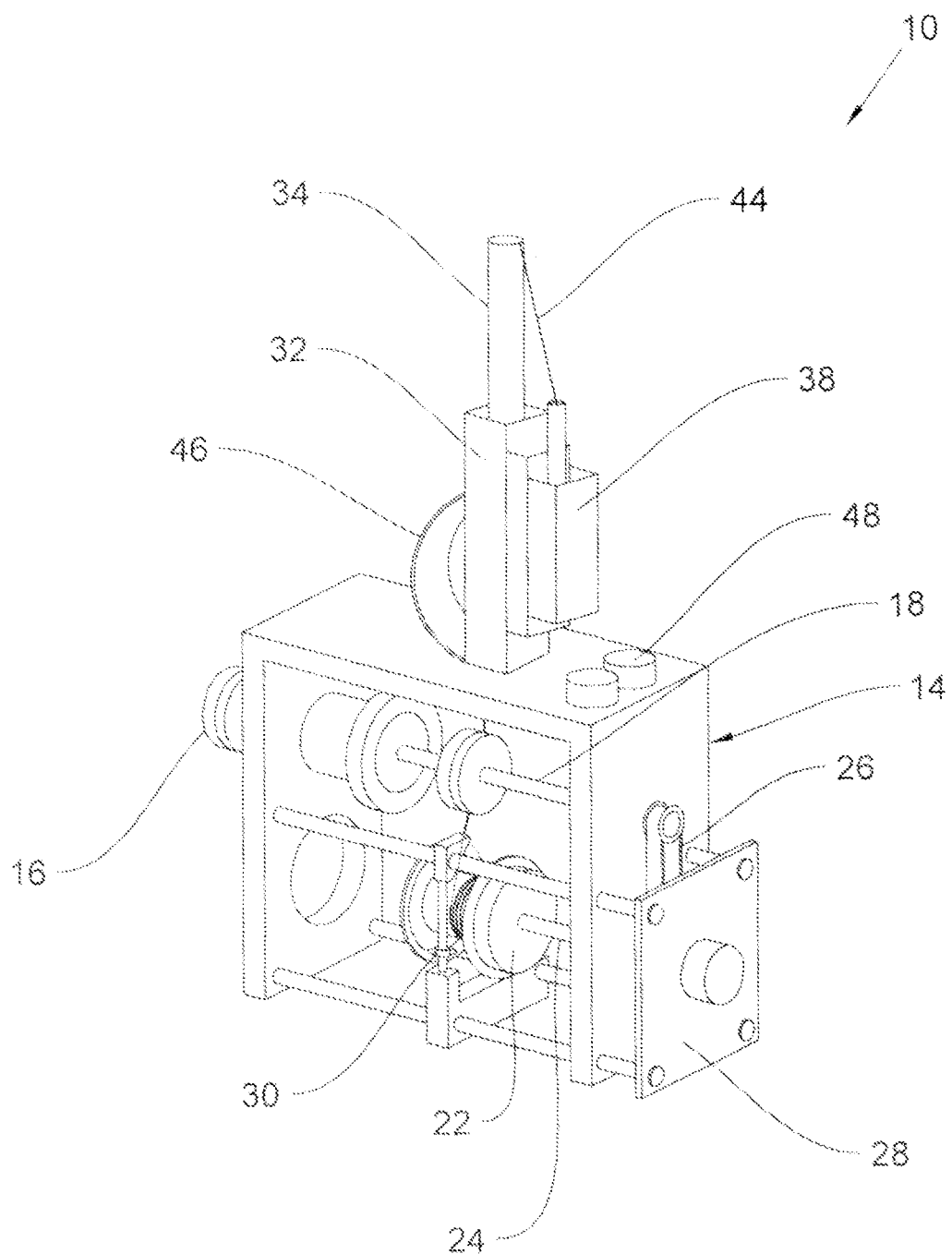
FIG. 2 is a rear perspective view illustrating the soldering wire dispensing apparatus constructed in accordance with the present invention, showing the mechanical components.
Figure 3:
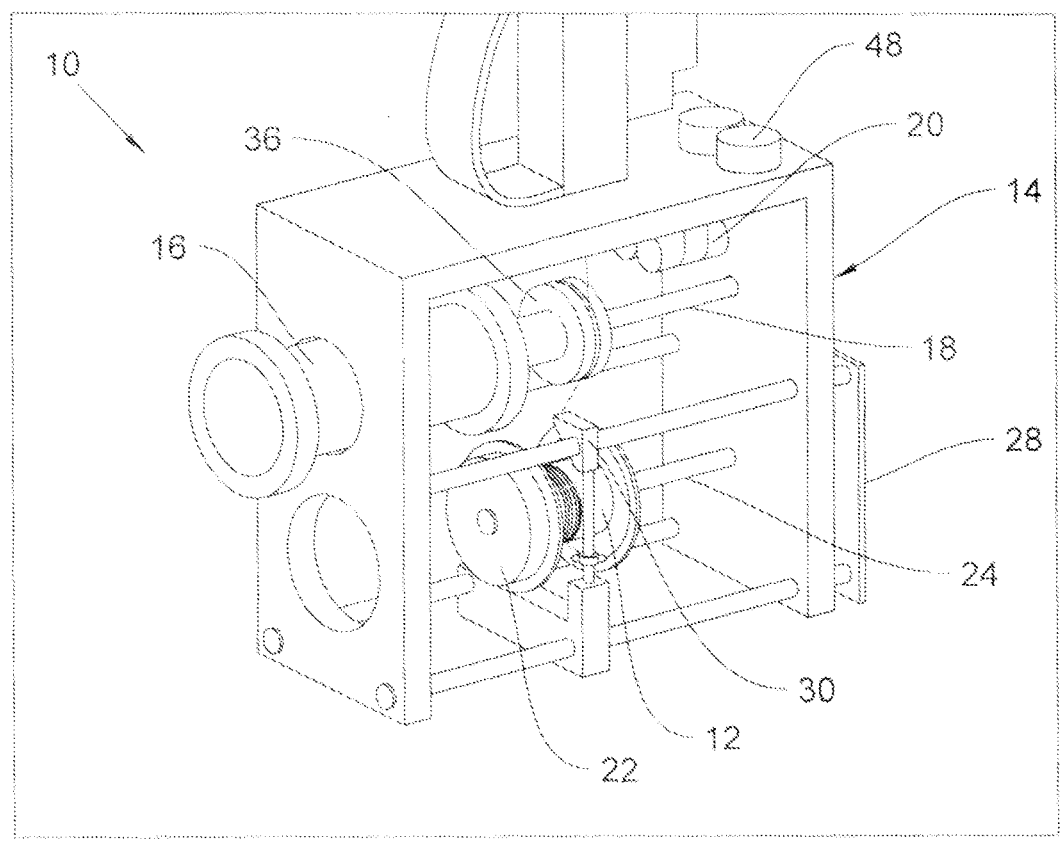
FIG. 3 is a close up rear perspective view illustrating the soldering wire dispensing apparatus, constructed in accordance with the present invention, showing the mechanical components.
Figure 4:
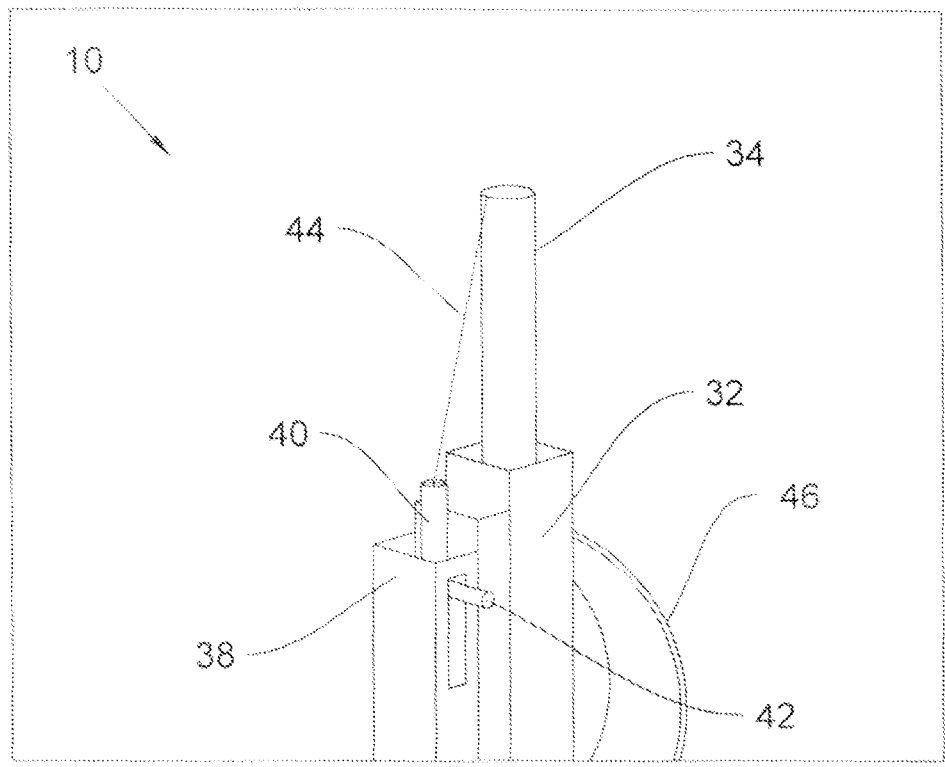
FIG. 4 is a close up perspective view illustrating the soldering wire dispensing apparatus, constructed in accordance with the present invention, showing an adjustable nozzle from which uncoiled wire exits the apparatus.
Figure 5:
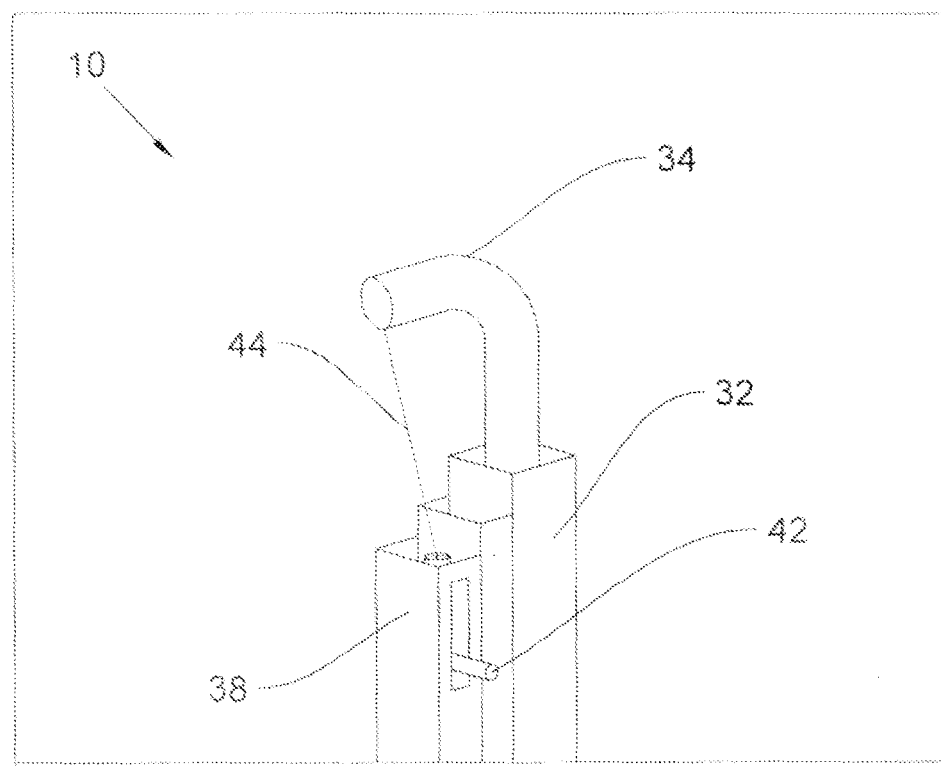
FIG. 5 is another close up perspective view illustrating the soldering wire dispensing apparatus, constructed in accordance with the present invention, showing the adjustable nozzle adjusted ninety degrees from which the uncoiled wire exits the apparatus.

The present invention, hereinafter referred to as a Soldering Wire Dispensing Apparatus, indicated generally at 10, is a portable, battery powered motorized tool mechanically engineered to dispense solder wire 12 smoothly, evenly, and on demand at the press of a button. The Soldering Wire Dispensing Apparatus 10 enables plumbers, HVAC technicians, jewelers and others to perform soldering operations without constantly having to stop to unwind the soldering wire 12. As the Soldering Wire Dispensing Apparatus 10 dispenses and takes up solder wire 12 smoothly and evenly, a worker can keep a soldering iron, gun, or torch in one hand and continue working uninterrupted by stopping and manually uncoiling workable lengths of solder wiring 12 from separate spools.

The Soldering Wire Dispensing Apparatus 10 of the present invention includes a support frame 14 having a top side, a bottom side, a front side, a rear side, a first side, and a second side. Preferably, the support frame 14 is substantially rectangular in shape, standing approximately fifteen and one-half (15½") inches in height, nine and one-half (9½") inches in width, and three and one-half (3½") inches in depth although having the support frame 14 with a different shape and/or different dimensions is within the scope of the present invention.

The Soldering Wire Dispensing Apparatus 10 of the present invention includes a motor 16 mounted within the support frame 14. Preferably, the motor 16 is mounted near the top side of the support frame 14 and extends at least partially through the first side of the support frame 14. A rotatable motor axle 18 extends from the motor 16 and through the second side of the support frame 14. The motor axle 18 rotates upon activation of the motor 16 to drive the soldering wire 12, as will be described in further detail below.

In a preferred embodiment, the motor 16 of the Soldering Wire Dispenser Apparatus 10 of the present invention is battery powered with rechargeable batteries 20 and an internal battery charger. In another embodiment, the motor 16 can be powered by conventional AC/DC electricity from a conventional outlet.

In addition, the Soldering Wire Dispenser Apparatus 10 of the present invention includes a soldering wire dispenser spool 22 having a predetermined and desired amount of soldering wire 12 wrapped around the dispenser spool 22. The dispenser spool 22 is rotatably mounted within the support frame 14 preferably between the first wall and the second wall of the support frame 14. Preferably, the dispenser spool 22 is mounted nearingly adjacent the bottom wall of the support frame 14 beneath the motor 16. A dispensing axle 24 extends from the dispenser spool 22 and through the second side of the support frame 14 substantially parallel to the motor axle 18.

Furthermore, the soldering wire dispensing apparatus 10 of the present invention includes a connecting belt 26 or the like linking the motor axle 18 to the dispensing axle 24 such that upon rotation of the motor axle 18, the dispensing axle 24 rotates accordingly. A guard plate 28 can be positioned over at least a portion of the connecting belt 26 to protect the connecting belt 26 from inadvertent contact.

The Soldering Wire Dispensing Apparatus 10 additionally includes a tensioning mechanism 30 mounted within the support frame 14 nearingly adjacent the dispenser spool 22 for tensioning the soldering wire 12 as the soldering wire 12 exits the dispenser spool 22. Since the Soldering Wire Dispensing Apparatus 10 is configured to handle various materials and diameters of solder wire 12 and flux cored wire, the tensioning mechanism 30 adjusts the tension on the solder wire 12, enabling an exact tension required for the material and diameter of the solder wire 12 in use.

Additionally, a soldering wire dispenser housing 32 is mounted to the top side of the support frame 14. A flexible wire nozzle 34 having a first end and a second end extends completely through the dispenser housing 32. The first end of the wire nozzle 34 is preferably fared and positioned within the support frame 14 under the top side of the support frame 14. The second end of the wire nozzle 34 extends from the dispenser housing 32. The soldering wire 12 extends from the dispenser spool 22, through the tensioning mechanism 30, into the first end of the wire nozzle 34, through the wire nozzle 34, and out the second end of the wire nozzle 34. A wire guide 36 can be mounted on and about the motor axle 18 to guide the soldering wire 12 around the motor axle 18 and into the first end of the wire nozzle 34.

The Soldering Wire Dispensing Apparatus 10 of the present invention further includes an adjustment housing 38 mounted to the dispenser housing 32. An upright bar 40 is slidably mounted within the adjustment housing 38 with a lever 42 connected to the upright bar 40 extending through the adjustment housing 38. The lever 42 allows movement of the upright bar 40 within the adjustment housing 38.

A connecting wire 44 extends between the second end of the wire nozzle 34 and the upright bar 40 of the Solder Wire Dispensing Apparatus 10 of the present invention for adjusting the angle of the wire nozzle 34 relative to the dispenser housing 32 and the adjustment housing 38. As the lever 42 is moved in a generally downward direction, the second end of the wire nozzle 34 bends up to a ninety (90°) angle relative to the dispenser housing 32 and the adjustment housing 38. The lever 42 releasably locks in place and is releasable by a release button 54 or the like to allow the lever 42 to move in a generally upward direction causing the second end of the wire nozzle 34 to be substantially parallel to the dispenser housing 32 and the adjustment housing 38.

The Soldering Wire Dispensing Apparatus 10 can also include a strap handle 46 mounted to the dispenser housing 32 for carrying and positioning the Soldering Wire Dispensing Apparatus 10. In addition, a light device 48 can be mounted to the top side of the support frame 14 to provide light to the user during use of the Soldering Wire Dispensing Apparatus 10. Also, the support frame 14 can be fabricated in molded thermoplastic and integrally contains securely locking tabs for easy removal and replacement.

The Soldering Wire Dispensing Apparatus 10 of the present invention has been designed, engineered, and constructed to perform several functions in particular to effectively aid an individual in soldering procedures. First and foremost, the Soldering Wire Dispensing Apparatus 10 holds a full roll of soldering wire 12 and dispenses the soldering wire 12 evenly and smoothly in response to an operator's pressing a toggle switch. Second, the Soldering Wire Dispensing Apparatus 10 is configured to handle various materials and diameters of solder wire 12 and flux cored wire. Tension on the wire is easily adjustable, enabling the user to set the Soldering Wire Dispensing Apparatus 10 to an exact tension required for the material and diameter of the wire in use. Third, the Soldering Wire Dispensing Apparatus 10 uncoils the solder wire 12 and dispenses it in a straight, easily manipulated manner. The wire nozzle from which the uncoiled solder wire 12 proceeds is also adjustable, so the wire is brought straight up and out at an angle of approximately ninety degrees to the support frame 14. This functionality increases the versatility of the Soldering Wire Dispensing Apparatus 10 and makes it much easier for an operator to handle the solder wire 12 in relation to the joint being soldered. Fourth, the motor of the Soldering Wire Dispensing Apparatus 10 forwardly dispenses solder wire 12 and also can operate in a reverse rotation to take the solder wire 12 up and rewind it onto the dispenser spool 22. Fifth, the Soldering Wire Dispensing Apparatus 10 is a self-contained battery operated device that requires no power cord and is easily carried transported and positioned where work transpires. Durably constructed with high quality materials and components, the Soldering Wire Dispensing Apparatus 10 will provide soldering assistance for many years.

Although this invention has been described with respect to specific embodiments, it is not intended to be limited thereto and various modifications which will become apparent to the person of ordinary skill in the art are intended to fall within the spirit and scope of the invention as described herein taken in conjunction with the accompanying drawings and the appended claims.

The invention claimed is:

1. A soldering wire dispensing apparatus for dispensing solder wire in a smooth and even manner, the soldering wire dispensing apparatus comprising:
   a support frame having a top side, a bottom side, a front side, a rear side, a first side, and a second side;
   a motor mounted within the support frame;
   a rotatable motor axle extending from the motor and through the second side of the support frame, the motor axle rotating upon activation of the motor;
   a dispenser spool mounted within the support frame, the dispenser spool having a predetermined amount of solder wire wrapped around the dispenser spool;
   a dispensing axle extending from the dispenser spool and through the second side of the support frame;
   a connecting belt linking the motor axle to the dispensing axle, the dispensing axle rotating upon rotation of the motor axle;
   a flexible wire nozzle having a first end and a second end, the first end of the wire nozzle positioned within the support frame, the second end of the wire nozzle extending above the top side of the support frame;
   an adjustment housing mounted to the top side of the support frame;
   an upright bar slidably mounted within the adjustment housing;
   a lever connected to the upright bar, the lever extending through the adjustment housing; and a connecting wire extending between the second end of the wire nozzle and the upright bar;

wherein the solder wire extends from the dispenser spool, into the first end of the wire nozzle, through the wire nozzle, and out the second end of the wire nozzle; and wherein upon moving the lever in a generally downward direction, the connecting wire between the second end of the wire nozzle and the upright bar bends the second end of the wire nozzle to a predetermined angle relative to the adjustment housing.

2. The soldering wire dispensing apparatus of claim 1 and further comprising:

a dispenser housing mounted to the top side of the support frame, at least a portion of the wire nozzle mounted within the dispenser housing, the adjustment housing mounted to a side of the dispenser housing.

3. The soldering wire dispensing apparatus of claim 2 and further comprising:

a strap handle mounted to the dispenser housing.

4. The soldering wire dispensing apparatus of claim 1 wherein the motor extends at least partially through the first side of the support frame.

5. The soldering wire dispensing apparatus of claim 1 wherein the motor is battery powered with rechargeable batteries and an internal battery charger.

6. The soldering wire dispensing apparatus of claim 1 wherein the dispenser spool is mounted nearingly adjacent a bottom wall of the support frame beneath the motor.

7. The soldering wire dispensing apparatus of claim 1 wherein the dispensing axle is substantially parallel to the motor axle.

8. The soldering wire dispensing apparatus of claim 1 and further comprising:

a guard plate can be positioned over at least a portion of the connecting belt.

9. The soldering wire dispensing apparatus of claim 1 and further comprising:

a tensioning mechanism mounted within the support frame nearingly adjacent the dispenser spool for tensioning the soldering wire as the soldering wire exits the dispenser spool.

10. The soldering wire dispensing apparatus of claim 1 wherein the wire nozzle extends completely through the dispenser housing with the second end of the wire nozzle outside the dispenser housing.

11. The soldering wire dispensing apparatus of claim 1 wherein the first end of the wire nozzle is flared.

12. The soldering wire dispensing apparatus of claim 1 wherein the lever releasably locks in place and is releasable by a release button to allow the lever to move in a generally upward direction causing the second end of the nozzle to be substantially parallel to the dispenser housing.

13. The soldering wire dispensing apparatus of claim 1 and further comprising:

a wire guide mounted on the motor axle for guiding the soldering wire around the motor axle and into the first end of the wire nozzle.

14. The soldering wire dispensing apparatus of claim 1 and further comprising:

a light device mounted to the support frame.

15. A soldering wire dispensing apparatus for dispensing solder wire in a smooth and even manner, the soldering wire dispensing apparatus comprising:

a support frame having a top side, a bottom side, a front side, a rear side, a first side, and a second side;

a motor mounted within the support frame;

a rotatable motor axle extending from the motor and through the second side of the support frame, the motor axle rotating upon activation of the motor;

a dispenser spool mounted within the support frame, the dispenser spool having a predetermined amount of solder wire wrapped around the dispenser spool;

a dispensing axle extending from the dispenser spool and through the second side of the support frame;

a connecting belt linking the motor axle to the dispensing axle, the dispensing axle rotating upon rotation of the motor axle;

a tensioning mechanism mounted within the support frame nearingly adjacent the dispenser spool for tensioning the soldering wire as the soldering wire exits the dispenser spool;

a dispenser housing mounted to the top side of the support frame;

a flexible wire nozzle having a first end and a second end, at least a portion of the wire nozzle mounted within the dispenser housing, the first end of the wire nozzle positioned within the support frame, the second end of the wire nozzle extending above the top side of the support frame;

an adjustment housing mounted to a side of the dispenser housing;

an upright bar slidably mounted within the adjustment housing;

a releasably securable lever connected to the upright bar, the lever extending through the adjustment housing; and a connecting wire extending between the second end of the wire nozzle and the upright bar;

wherein the solder wire extends from the dispenser spool, through the tensioning mechanism, into the first end of the wire nozzle, through the wire nozzle, and out the second end of the wire nozzle; and wherein upon moving the lever in a generally downward direction, the connecting wire between the second end of the wire nozzle and the upright bar bends the second end of the wire nozzle to a predetermined angle relative to the adjustment housing.

16. The soldering wire dispensing apparatus of claim 15 and further comprising:

a strap handle mounted to the dispenser housing.

17. The soldering wire dispensing apparatus of claim 15 wherein the motor is battery powered with rechargeable batteries and an internal battery charger.

18. The soldering wire dispensing apparatus of claim 15 and further comprising:

a guard plate can be positioned over at least a portion of the connecting belt.

19. The soldering wire dispensing apparatus of claim 15 and further comprising:

a wire guide mounted on the motor axle for guiding the soldering wire around the motor axle and into the first end of the wire nozzle.

20. A method for dispensing solder wire in a smooth and even manner, the method comprising:

providing a support frame having a top side, a bottom side, a front side, a rear side, a first side, and a second side;

mounting a motor within the support frame;

extending a rotatable motor axle from the motor and through the second side of the support frame;

rotating the motor axle upon activation of the motor;

mounting a dispenser spool within the support frame;

wrapping a predetermined amount of solder wire around the dispenser spool;
extending a dispensing axle from the dispenser spool and through the second side of the support frame;
linking the motor axle to the dispensing axle with a connecting belt;
rotating the dispensing axle upon rotation of the motor axle;
providing a flexible wire nozzle having a first end and a second end;
positioning the first end of the wire nozzle within the support frame;
extending the second end of the wire nozzle above the top side of the support frame;
mounting an adjustment housing to the top side of the support frame;
slidably mounting an upright bar within the adjustment housing;
connecting a lever to the upright bar;
extending the lever through the adjustment housing;
extending a connecting wire between the second end of the wire nozzle and the upright bar;
extending the solder wire from the dispenser spool, into the first end of the wire nozzle, through the wire nozzle, and out the second end of the wire nozzle;
moving the lever in a generally downward direction; and
bending the second end of the wire nozzle to a predetermined angle relative to the adjustment housing.

* * * * *